Aug. 7, 1928.  
C. G. HERSHEY  
1,679,524  
MEASURING INSTRUMENT  
Original Filed March 4, 1924   2 Sheets-Sheet 1

INVENTOR  
Carl G. Hershey  
BY Albert M. Austin  
ATTORNEY

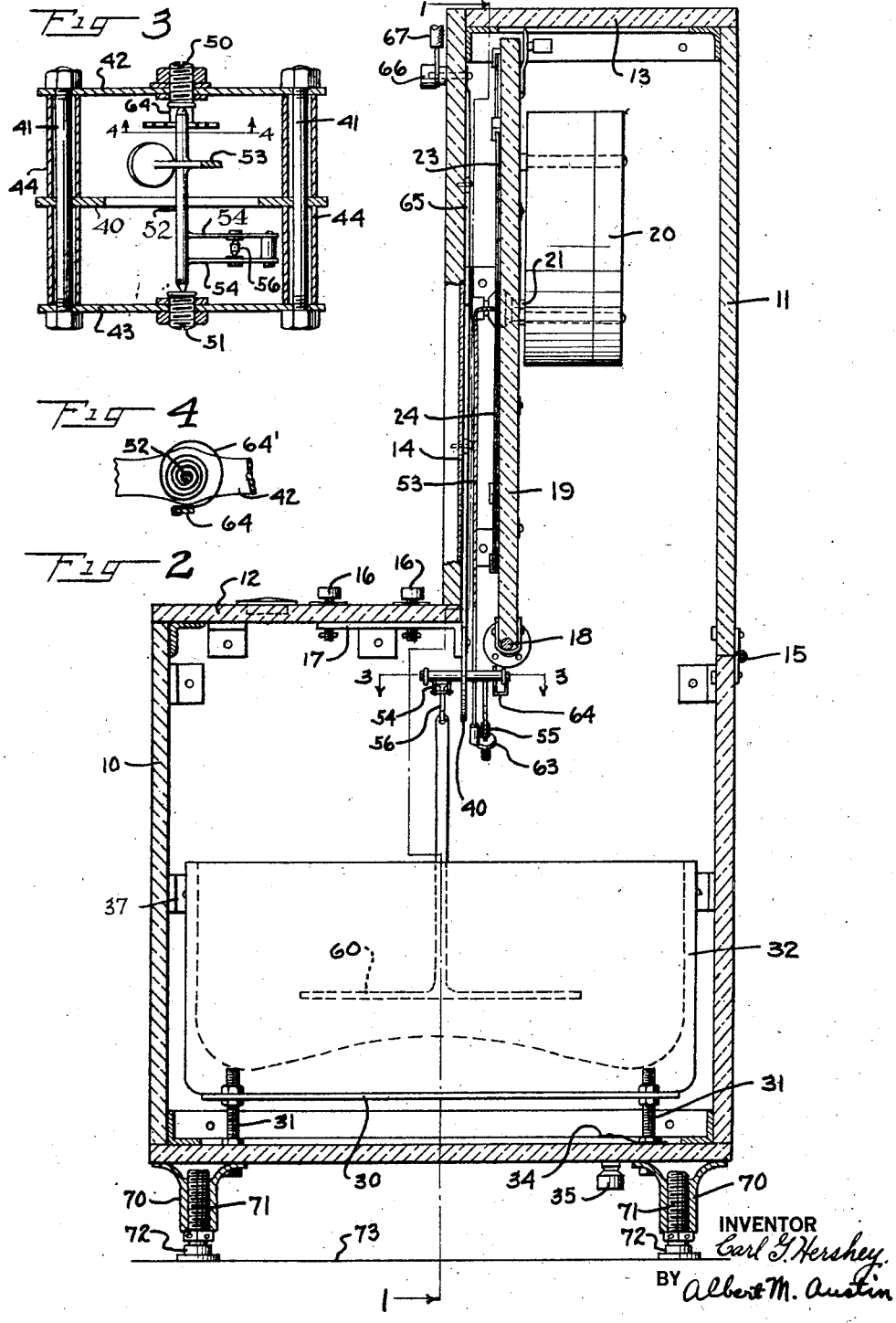

Patented Aug. 7, 1928.

1,679,524

UNITED STATES PATENT OFFICE.

CARL GORHAM HERSHEY, OF EL PASO, TEXAS, ASSIGNOR TO AMERICAN SMELTING AND REFINING COMPANY, OF NEW YORK, N. Y., A CORPORATION OF NEW JERSEY.

MEASURING INSTRUMENT.

Original application filed March 4, 1924, Serial No. 696,823. Divided and this application filed April 4, 1925. Serial No. 20,626.

This invention relates to instruments for measuring, indicating and recording electric differences of potential.

The invention is especially intended for use in measuring relatively high electric differences of potential, and provides a device which is extremely light and simple in construction and sensitive in operation. The moving parts are light and are conveniently mounted so as to reduce frictional contact.

Movement of the parts is dampened by the utilization of a liquid of suitable density, the same liquid preferably forming part of the insulating medium and an important feature of the invention is that the insulating medium comprises both a solid and a liquid material. Thus one of the electrodes may be positioned out of contact with the liquid material, and in position where it can be easily inspected.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

This application is a division of my application for improvements in measuring instruments, Serial No. 696,823, filed March 4, 1924.

In the accompanying drawings:

Figure 2 is a section taken on the line 2—2 of Figure 1;

Figure 3 is a section taken on the line 3—3 of Figure 2; and

Figure 4 is a section taken on the line 4—4 of Figure 3.

Figure 1:
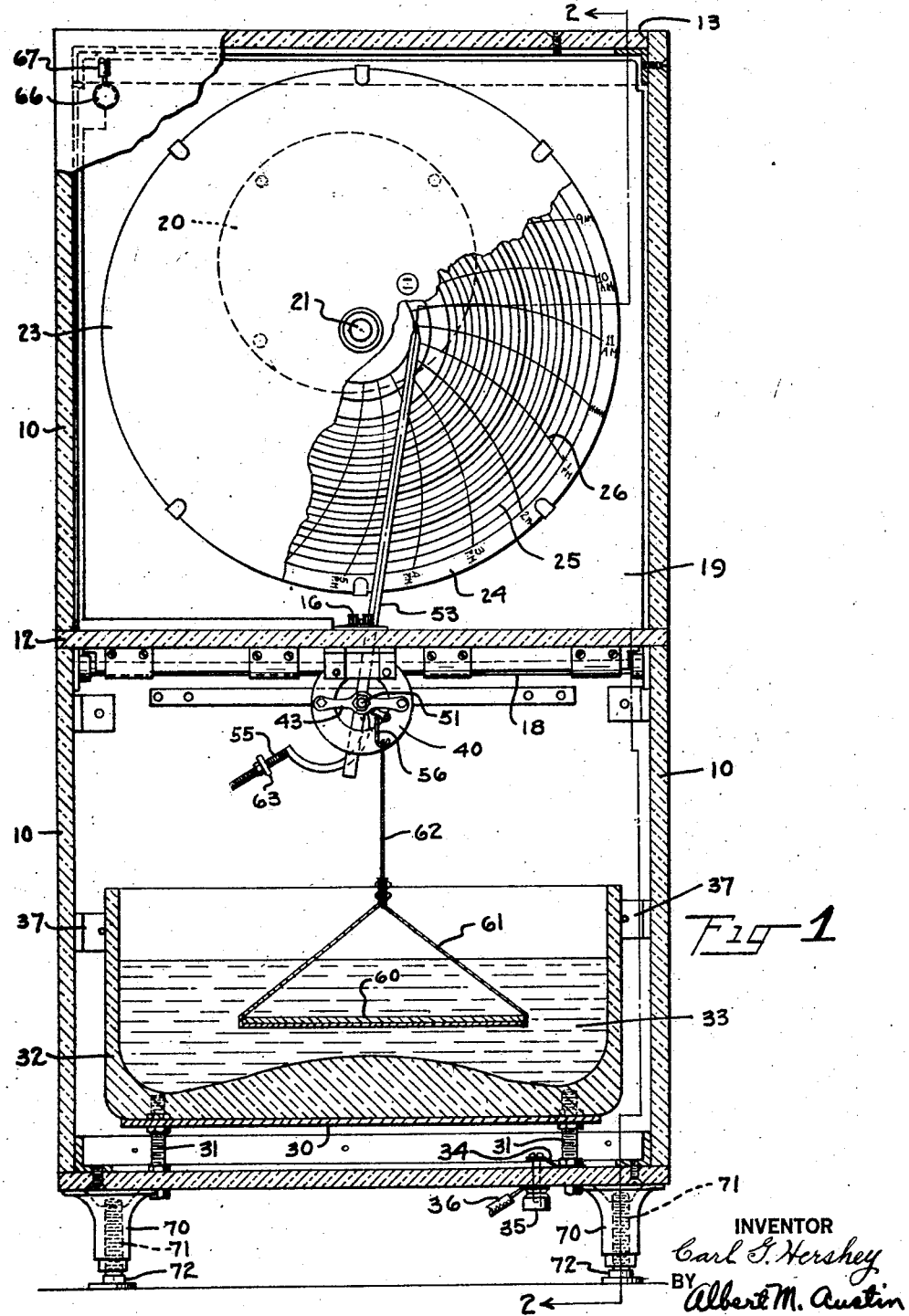
Figure 1 shows a sectional elevation of an instrument embodying features of the invention.

Referring to the drawings, there is a casing 10 of moulded mica or the like, having a separable back cover 11, a front shelf 12 and a top 13. A portion of the front of the casing 10 above the shelf 12 is transparent, being formed of a glass window 14. This permits of convenient observation and inspection of the actuating mechanism within the casing. The back cover plate is hinged along one edge, as at 15, by means of a suitable hinge. Adjustably secured to the lower face of the shelf 12 by means of a pair of adjusting screws 16, 16 is a bracket 17. Pivotally mounted on a hinge 18 is an insulating instrument board 19, formed of moulded mica or the like.

For recording the measurements to be made, there is provided a recording mechanism, including a clock 20 mounted upon the rear upper face of the board 19. The clock 20 has a main shaft 21 driven by the clock mechanism at a constant rate of speed. Mounted upon the shaft 21 to rotate therewith is a metal chart holder 23. The chart holder is preferably substantially flat and smooth, forming a mounting for a recording chart 24. The chart 24 is replaceable and its surface is suitably prepared.

The chart may have printed thereon circular concentric division lines, such as 25, 25, the spacing of which is calibrated to desired units of measurements, such as one hundred volts. The chart may also be divided by division lines, such as 26, 26, transverse to the concentric lines, the spacing being calibrated to units of time, such as quarter hour periods. It will be seen that the clock is made accessible by rotating the back cover 11 about its hinge 15 in a clockwise direction as seen in Figure 2, and that the chart holder is made readily accessible by similarly rotating the instrument board 19 in a similar direction about its hinge 18.

The indicating mechanism includes a stationary electrode plate 30 adjustably mounted upon a plurality of threaded studs such as 31 each clamped at its lower end to the bottom of the casing 10. Mounted upon the electrode plate 30 is a vat or container 32, preferably formed of glass, and there is provided within the container 32, a suitable quantity of oil or other substance 33, for dampening the movement of the moving parts, as will hereinafter appear. The plate 30 is formed of metal, and is a conductor of electricity, and is connected by means of a conducting strip 34 fastened to one stud 31 (see Figure 1) to a binding post 35 and by way of a conductor 36 to one pole of a source of electric potential difference, (not shown) the voltage of which is to be measured. The container 32 is held securely in place by suitable angles, such as 37, 37, fastened to the interior of the casing 10.

Secured to the bracket 17, as by being bolted thereto, is a ring 40, forming a mechanism support. There is mounted upon this ring, in substantially horizontal alignment and diametrically opposed, a pair of elongated bolts 41, 41, and upon the outer ends of these bolts are mounted a pair of spaced bars 42, 43, (see Figure 3). Suitable sleeves 44, 44 are provided upon the bolts 41 as shown, so that the bars 42 and 43 are held in substantially parallel and spaced relation to the plane of the ring 40.

For reducing the friction of the moving parts of the mechanism to a minimum, there is provided a pair of jewel bearings 50 and 51 affixed upon intermediate portions of the bars 42 and 43, respectively and opposite to one another. These form a support for a rotatable trunnion 52 upon which there is mounted for rotation therewith a radial pointer arm 53, an operating arm 54 and a counterweight arm 55. The operating arm has a saddle in which is pivotally mounted a link 56 extending downwardly therefrom.

For actuating the indicating mechanism there is provided a movable electrode comprising a substantially flat member 60 suspended in a cradle 61. The cradle 61 is fastened to the lower end of a lead 62, the upper end of which is fastened to the free end of the link 56. The pointer arm 53 is counterbalanced by a weight 63, adjustably positioned upon the counterweight arm 55.

A hair spring 64' (see Figure 4) interconnects electrically the trunnion 52 and a bracket 64 fastened to the bar 42 without materially interfering with the rotary movement of the trunnion 52.

The electrode 60, cradle 61, lead 62, link 56, trunnion 52, hairspring 64, bars 42 and 43, and ring 40 are formed of electrically conducting material. A conductor 65 connects the ring 40 with a binding post 66 positioned in the upper portion of the casing 10. A conductor 67 extends from the binding post 66 to the pole of the source of electric potential difference the voltage of which is to be measured opposite to the pole connected to the conductor 36 hereinbefore mentioned.

The casing 10 is provided with a plurality of hollow legs such as 70, each of which is internally screw threaded for the reception of an inverted bolt, the head 72 of which rests upon the floor 73. To take care of any irregularities of the floor the several bolts 71 are adjustably positioned so that the fixed electrode 30 is substantially level, and thus in substantial parallelism with the suspended electrode 60.

When used as an electrostatic voltmeter the device may be calibrated by applying a known voltage across the binding posts 35, 66. The suspended electrode 60 is attracted towards the fixed electrode 30, in accordance with well known laws of electricity, and the counterweight 63 is adjusted so that the pointer 53 takes up a desired position opposite the chart 24. This position then indicates one of the concentric lines corresponding to the voltage then being applied. Several different known voltages are then applied, and the successive positions of the pointer arm 53 are similarly observed.

The free end of the pointer arm 53 is spaced apart from the face of the chart, and thus friction is reduced to a minimum. A record is made of the successive indications by passing a spark between the pointer arm and the chart, the latter having been prepared for that purpose. This chart is acted upon by the action of the spark and when acted upon forms a record.

Thus it will be seen that I have provided an improved indicating and recording instrument for high electric voltage, in which a legible record is made without unnecessary contact and friction between the indicating mechanism and the recording mechanism. The records are made upon calibrated charts which may be readily replaced without disturbing the indicating mechanism. Access may be had to the clock mechanism for adjustment thereof without disturbing the calibration of the indicating mechanism.

Positive reliable electric contact is made to the moving parts of the indicating mechanism, by means of simple and rugged conducting means. Levelling and other adjustments of the mechanism may be effected in a positive manner.

The parts of my improved measuring device are simple, cheap and easy to assemble, and the structure is particularly well adapted for the purpose for which it is intended.

While I have shown and described and have pointed out in the annexed claims certain novel features of my invention, it will be understood that various omissions, substitutions and changes in the form and details of the device illustrated and in its operation may be made by those skilled in the art without departing from the spirit of my invention.

Having thus described my invention I claim:

1. In a measuring instrument, the combination of a stationary electrode and a movable electrode, means for conducting to said electrodes opposite charges of electricity respectively, and means separating said electrodes comprising a solid and a liquid insulating material.

2. In a measuring instrument, the combination of a vat formed of a material which is a non-conductor of electricity, a mass of liquid material which is a non-conductor of electricity, and a pair of oppositely charged, relatively movable electrodes, one within and one outside of said vat.

3. In a measuring instrument, the combination of a stationary electrode and a movable electrode arranged to be charged electrically at different electric potentials respectively, and means formed of an insulating material for maintaining a mass of non-conducting liquid around said movable electrode for damping the movement of the electrode, said maintaining means and said damping liquid forming insulation between the electrodes.

4. In a measuring instrument, the combination of a stationary electrode and a movable electrode arranged to be charged electrically at opposite electric potentials respectively, and means formed of an insulating material for maintaining a mass of non-conducting liquid around said movable electrode for damping the movement of the electrode, said maintaining means and said damping liquid forming insulation between the electrodes.

5. In a measuring instrument, the combination of a vat for containing a non-conducting liquid, a stationary electrode outside of said vat, and a movable electrode submerged in said liquid and maintained at a potential different from that of the stationary electrode.

6. An electrostatic voltmeter, including attracting and attracted parts, and means for separating said parts comprising a solid and a liquid insulating material, one of said parts being submerged in the liquid insulating material.

7. An electrostatic voltmeter, including attracting and attracted electrodes, means for separating said electrodes comprising a solid insulating material and a liquid insulating material, one of said electrodes being submerged in the liquid insulating material, and means for supporting the submerged electrode and for conducting an electric charge thereto.

8. In a measuring instrument, the combination of a stationary electrode and a movable electrode arranged to be charged electrically at different electrical potentials respectively, means for separating said electrodes comprising a solid insulator and a liquid insulator, the solid insulator being arranged to maintain the liquid insulator in predetermined position with respect to the movable electrode to dampen the movement thereof.

9. In a measuring instrument, the combination of a stationary electrode and a movable electrode arranged to be charged electrically at opposite electrical potentials, and means for maintaining a mass of non-conducting liquid between said electrodes for dampening the movement of the movable electrode and for electrically insulating the electrodes from each other, said means including a solid insulator for insulating the electrodes.

10. In a measuring instrument, the combination of a vat for containing a non-conducting liquid, a fixed electrode outside of the vat, and a movable electrode submerged in said liquid, said vat being formed of a non-conducting material.

11. In a measuring instrument, a vat of dielectric material containing a liquid dielectric, a stationary electrode outside said vat, a movable electrode immersed in said liquid, an indicator shaft pivoted above said vat and having an operating arm, a suspension element for suspending said movable electrode from said arm.

12. In a measuring instrument, a vat of dielectric material containing a liquid dielectric, a stationary electrode outside and on the bottom of said vat, a movable electrode immersed in said liquid above said stationary electrode, an indicator shaft pivoted above said movable electrode and having an operating arm, a suspension element for suspending said movable electrode from said arm, said shaft having a counter-weight and pointer.

In testimony whereof I have hereunto set my hand.

CARL GORHAM HERSHEY.